March 5, 1968  KENRO SEKINO ET AL  3,371,832
MOVABLE SPARE TIRE HOLDER

Filed Oct. 11, 1966  3 Sheets-Sheet 1

INVENTORS
Kenro Sekino
Yasuo Murase

BY

*William E. Parnell*

ATTORNEY

March 5, 1968     KENRO SEKINO ETAL     3,371,832
MOVABLE SPARE TIRE HOLDER

Filed Oct. 11, 1966     3 Sheets-Sheet 2

INVENTORS
Kenro Sekino
Yasuo Murase

BY

*William C. Parnell*

ATTORNEY

March 5, 1968  KENRO SEKINO ET AL  3,371,832
MOVABLE SPARE TIRE HOLDER
Filed Oct. 11, 1966  3 Sheets-Sheet 3

INVENTORS
Kenro Sekino
Yasuo Murase
BY
*William E. Parnell*
ATTORNEY

United States Patent Office 3,371,832
Patented Mar. 5, 1968

3,371,832
MOVABLE SPARE TIRE HOLDER
Kenro Sekino and Yasuo Murase, Toyota-shi, Japan, assignors to Toyota Motor Company Limited, Toyota-shi, Japan, a corporation of Japan
Filed Oct. 11, 1966, Ser. No. 585,881
Claims priority, application Japan, Oct. 18, 1965, 40/64,020; Apr. 21, 1966, 41/25,680
12 Claims. (Cl. 224—42.21)

ABSTRACT OF THE DISCLOSURE

Spare tire holders on rear-door automobiles have been operable only from the outside of the vehicle. The present invention relates to a spare tire holder that can be operated from inside the automobile and which is effective to swing the spare tire away from the rear door, allowing unimpeded use of the rear door.

---

The present invention relates generally to spare tire holders on automobiles, and more particularly, tires mounted on the outside of an automobile on the rear end thereof. The invention is particularly applicable to vehicles having rear doors.

In most standard size passenger automobiles, the spare tire is mounted in or under the trunk compartment. In station wagons and small cars this is often inconvenient or impossible, due to the small size of the trunk compartment or the complete lack of same. In many station wagons, the spare tire is mounted under the deck adjacent the rear door or gate, but this detracts substantially from the load carrying capacity of the deck area. In many such vehicles, and particularly in small cars and wagons having a rear door or gate, it is most convenient to mount the spare tire outside the vehicle itself but in such a manner that it does not interfere with operation of the rear door or gate. In most instances, the size of the rear door, its strength or its general configuration prevents the rigid mounting of the spare tire thereon. Under these circumstances it is necessary to provide a movable spare tire holder which may be swung out of the way to permit entrance to and egress from the rear portion of the vehicle.

While such movable spare tire holders have been proposed heretofore, they have not proved satisfactory. The most serious defect of such devices is that the latch or locking mechanism holding the spare tire in the closed position is operable only by a person standing adjacent thereto outside the vehicle, i.e. it is not operable by a passenger in the rear portion of the vehicle. In some cars, it is not even possible for such a passenger to even open the rear door entirely from the inside. To permit egress from the vehicle of a person sitting in the rear portion, it is thus necessary for the driver or another passenger to get out of the car, walk around to the back and release the latch or lock holding the spare tire in place, before the rear door or gate can be opened. This is a particularly inconvenient procedure in inclement weather.

It is thus a general object of the present invention to provide an improved, movable spare tire mount for vehicles having rear doors.

A further object of the invention is to provide an improved, movable spare tire mount which is operable by a passenger in the rear portion of the automobile.

A still further object of the invention is to provide an improved, movable spare tire mount which is operable by the driver from the driver's seat.

Yet another object of the invention is to provide an improved, movable spare tire holder which can be adapted for operation with substantially any kind of rear door or gate arrangement.

Various other objects and advantages of the invention will become clear from the following detailed description of several embodiments thereof, and the novel features will be particularly pointed out in connection with the appended claims. Reference will also be made to the accompanying drawings, wherein:

Figure 1:
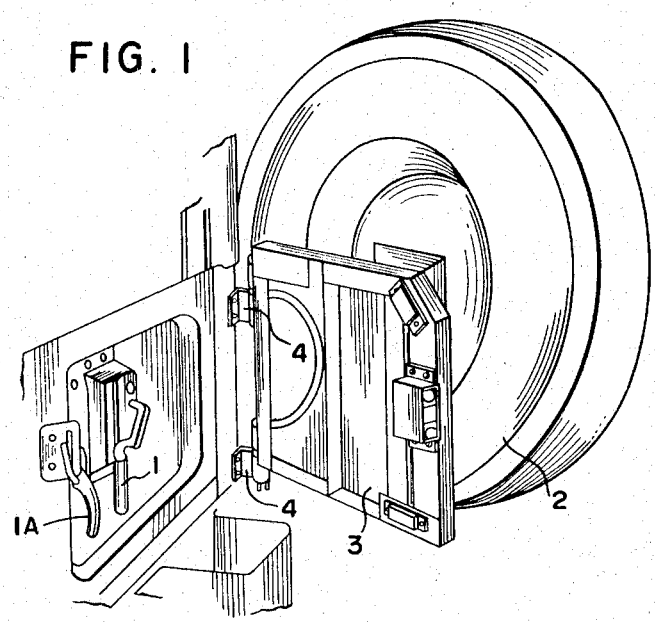
FIGURE 1 is a perspective view of a movable spare tire holder as suggested by prior workers.

FIGURE 1 illustrates a conventional device as might be installed on a Jeep (trademark) or wagon. The spare tire 2 is mounted on a carrier or holder 3 which is hinged at 4 to swing away from the rear door. A handle 1 operates a latch which holds carrier 3 in the closed position and, once carrier 3 has been swung away, handle 1 can be operated to open the rear door or gate. It is clear that operation of this mechanism by a person sitting in the rear of the automobile is manifestly impossible.

Figure 2:
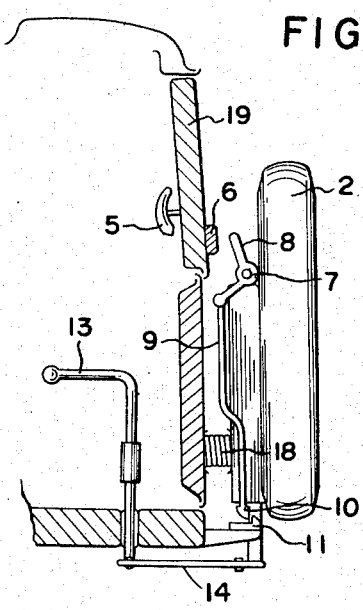
FIGURE 2 is an elevation view, partly in section, of an embodiment of the present invention.
Figure 3:
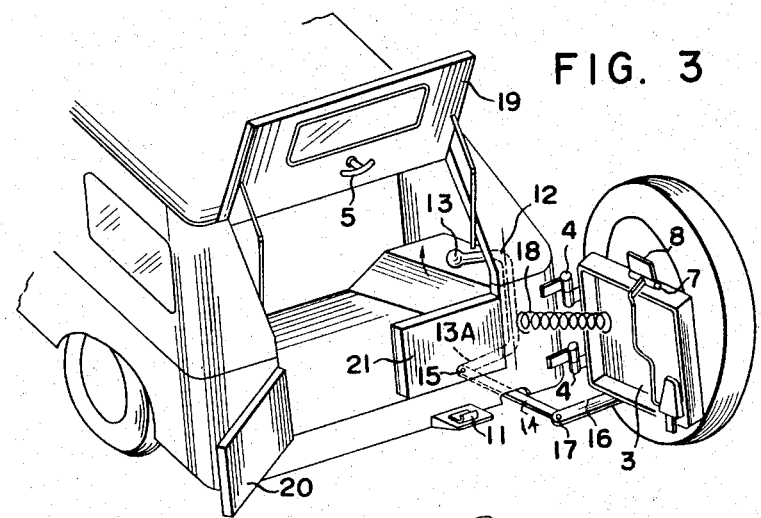
FIGURE 3 is a perspective view of the embodiment of FIGURE 2.

FIGURES 2 and 3 illustrate an embodiment of the invention applied to a vehicle having a rear door comprising an upwardly-opening upper portion 19 and two outwardly opening lower portions 20, 21. In this embodiment, a projection 6 is provided on upper door portion 19. When the latter is opened from the inside by means of latch handle 5, the said projection 6 engages lock lever 8, which has a general L-shaped cross-section, and which is rotatably mounted on pin 7, the latter being attached to carrier 3. A connecting rod 9 is rotatably linked to the opposite extremity of lock lever 8. Connecting rod 9 has at its lower end a nail portion 10 engaging a latch 11 attached to the vehicle body.

Within the rear portion of the automobile near the rear door there is a stop lever, indicated generally at 12 comprising an upright shaft, a handle 13 and an arm 13A, the entire assembly having a broad U-shaped cross-section. The extremity of arm 13A is rotatably linked to a connecting rod 14 by means of a pin or rivet 15, and a second pin or rivet 17 rotatably links rod 14 to a second rod 16, the latter being pinned to carrier 3. A spring 18 restrains the free swinging of carrier 3 and tire 2 mounted thereon.

In operation, a passenger in the rear portion of the vehicle desiring to disembark merely releases the door latch with handle 5 and pushes upper door portion 19 outward. Projection 6 engages and rotates lock lever 8, which in turn raises rod 9 and disengages nail portion 10 from latch 11. The spare tire carrier then swings open, being pushed by coiled spring 18, which also prevents the carrier from swinging on hinge 4 until tire 2 hits the car body. At this point lower doors 20, 21 will open freely.

When a passenger desires to enter the rear compartment, he merely climbs in and closes the doors after him. He then rotates handle 13 on lever 12 in the direction shown by the arrow in FIGURE 3, and carrier 3 is caused to swing inwardly until nail portion 10 engages catch 11, thus locking the spare tire holder in position.

Figure 4:
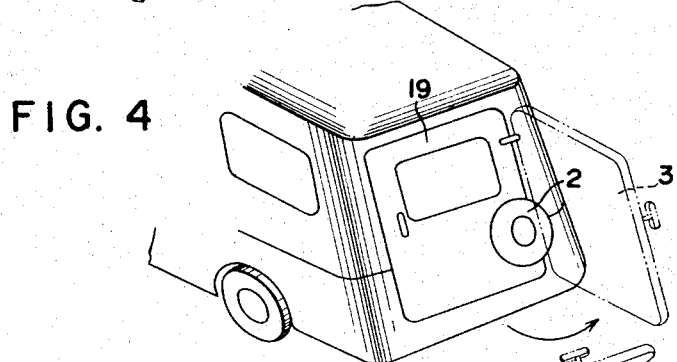
FIGURES 4–6 are perspective views illustrating how the invention may be applied to vehicles having various rear door or gate arrangements.
Figure 5:
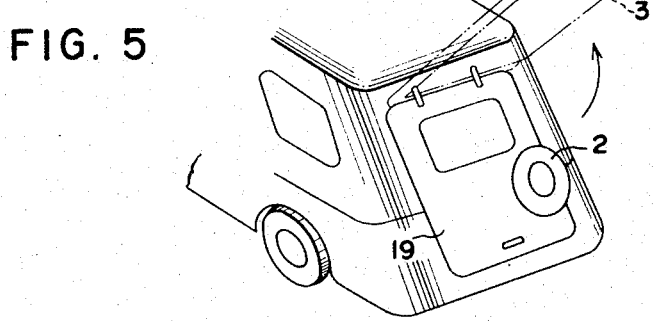
Figure 6:
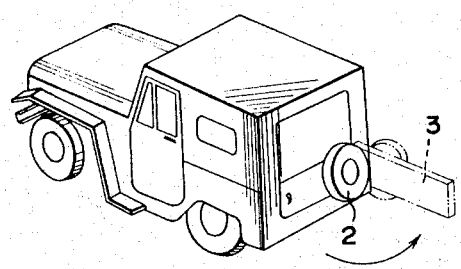

FIGURES 4-6 illustrates the fact that the instant invention is applicable to other rear-door arrangements. In FIGURE 4, the single rear door is hinged at the side and opens horizontally. In FIGURE 5, the single rear door is hinged at the top and opens upwardly. FIGURE 6 is similar to FIGURE 4 but for a two-part door.

The invention is also adaptable to tail-gate type doors which are hinged at the bottom and open downwardly. In this instance projection 6 and lever 8 would both be located adjacent nail portion 10 and connecting rod 9 would not be necessary, since nail portion 10 could be directly linked to lever 8.

Figure 7:
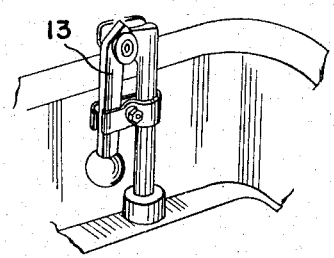
FIGURE 7 is a perspective view of an alternative embodiment of lever 13 illustrated in FIGURES 2 and 3.

Since space may be at a premium in the rear portion of the vehicle, it may be desirable to have handle 13 foldable; such an arrangement is illustrated in FIGURE 7.

Figure 8:
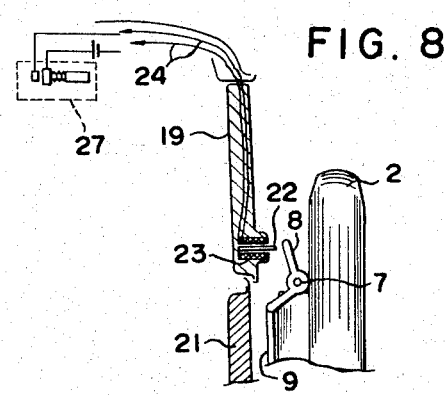
FIGURES 8–10 are elevation views, partly in section, illustrating electrically-driven embodiments of the invention.
Figure 9:
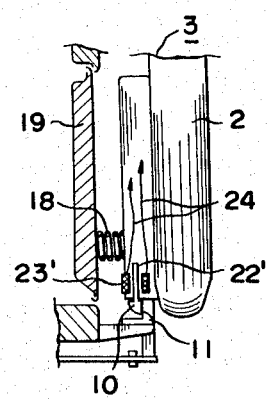
Figure 10:
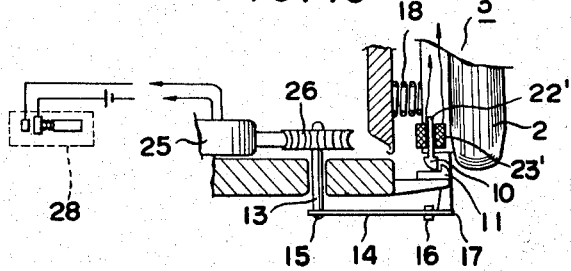

FIGURES 8–10 illustrates three electrically-driven embodiments of the invention.

With reference to the embodiment of FIGURE 8, the projection 6 (FIGS. 2–3) is replaced by an electromagnetic solenoid 23 having a knock rod 22 inserted therein. Solenoid 23 is connected to a switch 27 and a source of current by wires 24. Switch 27 is preferably mounted in the dashboard of the vehicle for operation by the driver. Operation of this embodiment is similar to the embodiment of FIGURES 2–3, knock rod 22 performing the function of projection 6 when energized. It will be noted that this embodiment relates only to releasing the spare tire holder.

A mechanically simplified embodiment is illustrated in FIGURE 9. Elements 7, 8 and 9 are eliminated in this embodiment. The solenoid 23' and knock rod 22' here are connected directly to nail portion 10, and when solenoid 23' is energized by wires 24, it lifts nail portion 10, disengaging latch 11. While this embodiment is mechanically simplified, the mounting of solenoid 23' on carrier 3 requires the use of waterproof coverings for wires, connections, etc. In the alternative the positions of solenoid 23' and latch 11 can be reversed, in which instance all wiring and connections will be within the vehicle body. Again this embodiment relates only to release of the spare tire holder from the locked position.

The embodiment of FIGURE 10 incorporates the latch-releasing solenoid 23' and a knock rod 22' as illustrated in FIGURE 9, and also includes means for remotely controlling the closing or locking of the spare tire holder. In this embodiment shaft 13 is turned by a wormgear-worm wheel combination 26 driven by a motor 25. Motor 25 is controlled by a switch 28 preferably located on the dashboard for remote operation by the driver. It will be understood that switches 27 and 28 may comprise a single unit having "open," "close" and "off" positions. In this embodiment, it will be clear that spring 18 must be powerful enough to swing the spare tire holder away from the body and turn shaft 13 and gear 26; conversely, motor 25 must have sufficient power to compress spring 18. This embodiment thus allows the driver to control movement of the spare tire holder in both directions without assistance.

Various changes in the details, steps, materials and arrangements of parts, which have been herein described and illustrated in order to explain the nature of the invention, may be made by those skilled in the art within the principle and scope of the invention as defined in the appended claims.

What is claimed is:
1. In an automotive vehicle having a door at the rear thereof and a movable spare tire holder outside of and adjacent said door, the improvements comprising:
   latch means capable of locking said spare tire holder in a position outside and adjacent one side of the rear door of said vehicle;
   latch releasing means operable from within said vehicle;
   hinge and spring means capable of swinging said spare tire holder outwardly to a position away from the outside of said rear door on release of said latch means; and
   closure means operable from within said vehicle and capable of swinging said spare tire holder from the open position away from said rear door to the closed position adjacent said rear door and into engagement with said latch.

2. The improvement of claim 1, wherein said latch and latch releasing means comprise:
   a projection on said rear door;
   lever means mounted on said spare tire holder and actuatable by said projection upon outward movement of said rear door; and
   a latch engageable to said vehicle body connected to said lever means for operation thereby.

3. The improvement of claim 1, wherein said latch and latch releasing means comprise:
   a latch mounted on said spare tire holder and engageable to said vehicle body;
   solenoid means capable of releasing said latch;
   a source of current; and
   switch means within said vehicle capable of connecting said source of current to said solenoid means to energize the same.

4. The improvement of claim 2, wherein said projection comprises a solenoid having a knock rod, and additionally comprising
   a source of current;
   switch means within said vehicle capable of connecting said source of current to said solenoid to energize the same;
   said knock rod actuating said lever means when said solenoid is energized.

5. The improvement of claim 1, wherein said closure means comprises:
   a rotatable shaft vertically mounted within said vehicle and having an eccentric arm on the lower end thereof; and
   connecting rod means linking said eccentric arm and said spare tire holder, rotation of said shaft being operable to move said spare tire holder from said open position to said closed position.

6. The improvement of claim 5, and additionally comprising a handle mounted eccentrically on the upper end of said shaft to facilitate rotation of same.

7. The improvement of claim 5, and additionally comprising:
   motor-driven gear means capable of rotating said shaft;
   a source of current; and
   switch means within said vehicle and capable of connecting said source of current and said motor for operation of the latter.

8. A movable spare tire holder assembly for use on vehicles having rear doors comprising:
   a carrier hingedly attached to the body of said vehicle adjacent and to one side of the outside of said door, said carrier having means for attachment of a spare tire thereto;
   latch means mounted on said carrier capable of locking said carrier in a closed position outside of and adjacent the rear door of said vehicle;
   latch releasing means operable from within said vehicle;
   resilient means capable of swinging said carrier from said closed position outwardly to an open position away from said rear door on release of said latch means; and closure means operable from within said vehicle and capable of swinging said carrier from said open position to said closed position.

9. The spare tire holder as claimed in claim 8, wherein said latch and latch releasing means comprise lever means actuatable by said rear door.

10. The spare tire holder as claimed in claim 8, wherein said latch and latch releasing means are electrically operated.

11. The spare tire holder as claimed in claim 8, wherein said closure means comprises a rotatable shaft linked to said carrier.

12. The spare tire holder as claimed in claim 11, wherein said shaft is electrically rotated to effect said closure.

References Cited

UNITED STATES PATENTS

| 1,646,266 | 10/1927 | Stoner. | |
| 2,091,071 | 8/1937 | Girl | 214—451 X |
| 2,170,981 | 8/1939 | Walter | 224—42.05 X |
| 2,698,118 | 12/1954 | Dickason | 224—42.21 |
| 2,797,035 | 6/1957 | Rickert | 224—42.21 |

FOREIGN PATENTS

| 500,040 | 6/1930 | Germany. |

HUGO O. SCHULZ, *Primary Examiner.*

GERALD M. FORLENZA, *Examiner.*

R. J. SPAR, *Assistant Examiner.*